(12) United States Patent
Kim (10) Patent No.: US 7,342,726 B2
(45) Date of Patent: Mar. 11, 2008

(54) AUTOFOCUSING OPTICAL SYSTEM OF CAMERA MODULE

(75) Inventor: Tae Young Kim, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/730,333

(22) Filed: Mar. 30, 2007

(65) Prior Publication Data

US 2007/0229970 A1    Oct. 4, 2007

(30) Foreign Application Priority Data

Mar. 30, 2006   (KR) ...................... 10-2006-0029009

(51) Int. Cl.
  *G02B 1/06*   (2006.01)
  *G02B 3/12*   (2006.01)
(52) U.S. Cl. ........................ 359/666; 359/665; 359/773
(58) Field of Classification Search ................ 359/665, 359/666, 773
See application file for complete search history.

(56) References Cited

U.S. PATENT DOCUMENTS 4,890,903 A * 1/1990 Treisman et al. ........... 359/666
7,251,392 B2 * 7/2007 Kuiper et al. ............... 359/666
2004/0228003 A1 * 11/2004 Takeyama et al. .......... 359/666
2006/0056042 A1 * 3/2006 Kim et al. ................... 359/666
2006/0164732 A1 * 7/2006 Lee et al. .................... 359/676
2007/0217022 A1 * 9/2007 Kuiper et al. ............... 359/666

FOREIGN PATENT DOCUMENTS

JP      2005-84387        3/2005
WO     WO 03/069380 A1   8/2003

* cited by examiner

*Primary Examiner*—Evelyn A. Lester (57) ABSTRACT

An autofocusing optical system of a camera module which can be installed in a subminiature camera module. In the optical system, a first lens group has an overall positive refractive power. A second lens group has an overall negative refractive power. The second lens group includes a liquid lens having a meniscus formed between non-miscible first and second liquids, the first liquid having conductivity and polarity, the meniscus having a curvature radius changing in response to a voltage applied to serve as a refractive surface, thereby autofocusing the optical system, a first cover lens for sealing the liquid lens at an object side and a second cover lens for sealing the liquid lens at an image side. A third lens group has an overall positive refractive power. Also, a fourth lens group has an overall negative refractive power.

14 Claims, 10 Drawing Sheets

AUTOFOCUSING OPTICAL SYSTEM OF CAMERA MODULE

CLAIM OF PRIORITY

This application claims the benefit of Korean Patent Application No. 2006-29009 filed on Mar. 30, 2006 in the Korean Intellectual Property Office, the disclosure of which is incorporated herein by reference.

BACKGROUND OF THE INVENTION

1. Field of the Invention

The present invention relates to an autofocusing optical system of a camera module, more particularly, which adopts a liquid lens with a curvature radius changing in response to a voltage applied, to achieve a smaller size and high-definition.

2. Description of the Related Art

In general, a camera is constructed of a plurality of lenses, and moves the lenses to change relative distances thereof, thereby adjusting an optical focal length. Recently, a mobile telecommunication terminal has been installed with a camera, which thus enables photographing of still and live images. Also, the camera is increasingly improved in its capability to realize high definition.

However, a conventional camera module installed in the mobile telecommunication terminal adopts a fixed focus system. This renders a focus hardly adjustable at a specific distance, thus hampering definition of an image. Therefore, the camera module of a mega pixel or more should essentially possess a focusing function.

To this end, a need has arisen to apply a camera module with autofocusing, close-up and optical zooming mechanisms to a mobile phone. However, such a conventional camera module is hard to mount on a small-sized mobile phone.

That is, in the conventional module, a relative distance between an image sensor and a lens is altered and a DC motor is employed as a driving source for focusing and/or zooming. Here, a plurality of deceleration gears are connected to each other to change a relative distance between the lenses. Thus decline in response rate and variation in rotational speed may hinder a precise control of location necessary to perform focusing accurately. Besides, the conventional camera module, which is large in size and complex in design, hardly performs autofocusing in an extremely limited space of a compact optical system such as a mobile phone.

What is more, the lenses adopted in plurality for high-definition increase manufacturing costs, and power consumption owing to mechanical operation required.

In an attempt to solve these problems, a variable focal lens has been employed to achieve autofocusing.

Figure 1:
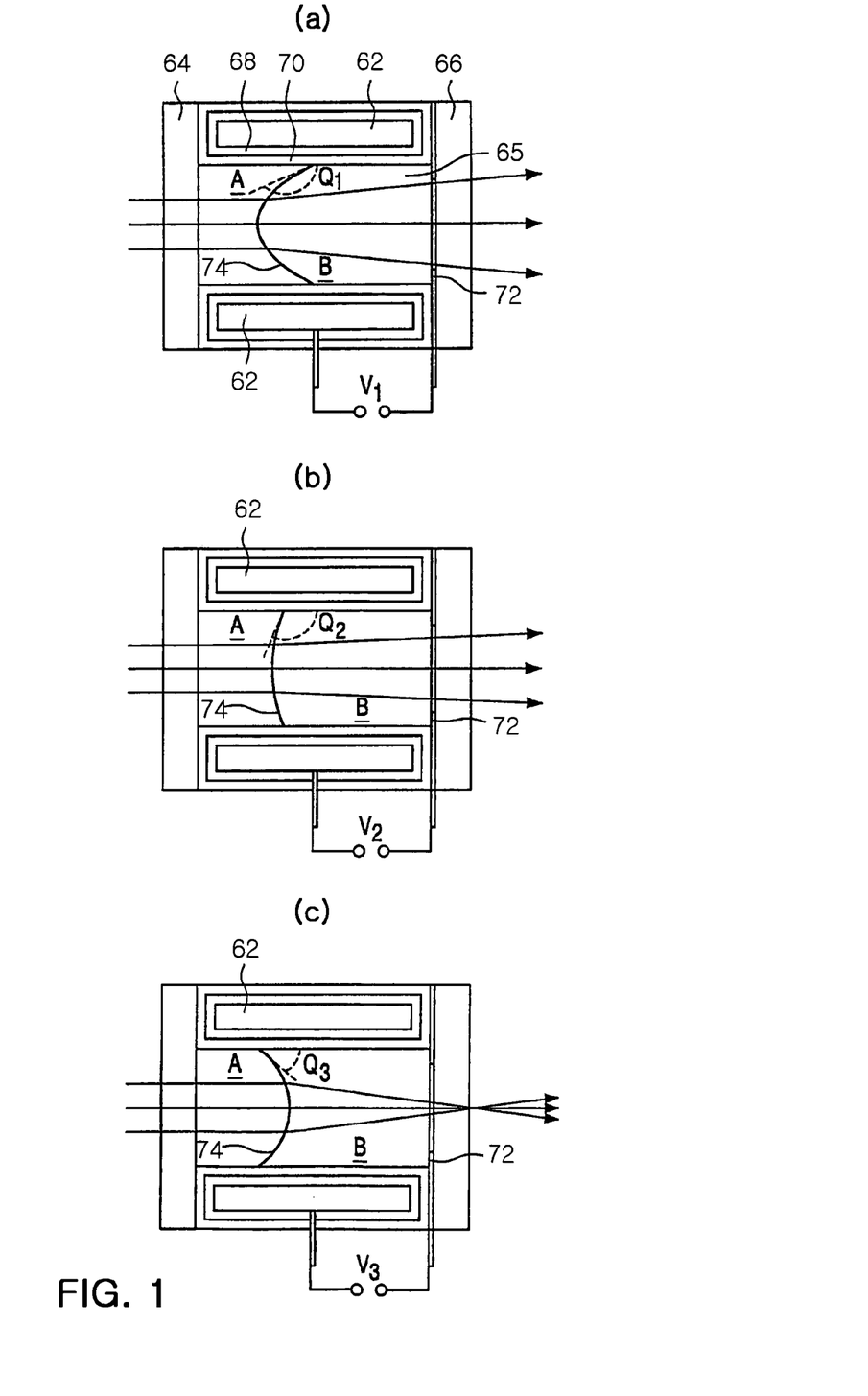
FIGS. 1(a) to 1(c) are schematic cross-sectional views illustrating a conventional variable focal lens.

FIGS. 1(a) to 1(c) are schematic cross-sectional views illustrating a variable focal lens proposed in PCT Pub. No. WO 03/069380.

As shown in FIGS. 1(a) to 1(c), the variable focal lens includes a substantially cylindrical fluid chamber 65, a fluid contact layer 70, a first electrode 62 and a second electrode 72. The fluid chamber 65 has a cylinder wall, and houses first and second fluids A and B in contact over a meniscus 74, which are non-miscible and differ in refractivity. The fluid contact layer 70 is arranged on the inside of the cylinder wall. The first electrode 62 is separated from the first and second fluids A and B by the fluid contact layer 70. The second electrode 72 acts on the second fluid B.

Here, the first electrode 62 is substantially cylindrical, coated by an insulating layer 68 and made of a metallic material. The second electrode 72 is arranged at one end of the fluid chamber 65.

Moreover, a transparent front element 64 and a transparent rear element 66 are disposed to seal the fluid chamber 65 for containing the fluids.

The variable focal lens structured as above operates as follows.

When no voltage is applied between the first electrode 62 and the second electrode 72, the fluid contact layer 70 has a higher wettability with respect to the first fluid A than the second fluid B.

Due to electrowetting, the wettability by the second fluid B varies under the application of a voltage between the first and second electrodes 62 and 72, which tends to change the contact angle Q1, Q2 and Q3 of the meniscus, as shown in FIGS. 1(a) to FIG. 1(c).

In consequence, the shape of the meniscus is variable depending on the applied voltage.

That is, as shown in FIGS. 1(a) to 1(c), in accordance with the magnitude of the voltage applied, the contact angle between the meniscus 74 and the fluid contact layer 70 measured in the first fluid B varies into 1400, 1000, and 600, respectively.

Here, FIG. 1(a) illustrates a lens configuration with a high negative refractive power, FIG. 1(b) illustrates a lens configuration with a low negative refractive power, and FIG. 1(c) illustrates a lens configuration with a positive refractive power.

As described above, the variable focal lens using fluids (hereinafter "liquid lens") is more advantageous for miniaturization compared with the lens for adjusting a focus through mechanical operation.

However, the liquid lens, if adopted alone, demonstrates definition of merely about 300 thousand pixels without assuring high definition. Thus the liquid lens finds a limited application in the current meca pixel camera.

An autofocusing optical system using such a liquid lens is disclosed in Japanese Laid-open Patent No. 2005-84387.

But in the autofocusing optical system proposed in the document, a liquid lens is disposed in front of a typical fixed focus optical system to achieve autofocsing. This however prolongs a total length of the optical system equal to the dimension of the liquid lens along the optical axis, which is disposed in front of the optical system as just described.

Furthermore, in the optical system of the above document, the liquid lens is disposed in a first lens group, and thus rendered vulnerable to drop impact. That is, since a mobile telecommunication terminal is often dropped off inadvertently, a critical factor lies in how reliably the terminal and the camera module installed therein withstand drop impact. However, in the Japanese patent, the liquid lens is disposed in the first lens group, risking great damage from external impact.

Notably, the liquid lens placed in the first lens group increases a refractive power, thus susceptible to tolerance.

SUMMARY OF THE INVENTION

The present invention has been made to solve the foregoing problems of the prior art and therefore an aspect of the present invention is to provide an autofocusing optical system of a camera module which can be manufactured in a smaller size and with high definition, and is superior in various aberrational characteristics.

Another aspect of the invention is to provide an autofocusing optical system of a camera module applicable to a subminiature product which is strong against drop impact, such as a mobile telecommunication terminal.

Another aspect of the invention is to provide an autofocusing optical system of a camera module which consumes less power.

According to an aspect of the invention, the autofocusing optical system of a camera module includes a first lens group having an overall positive refractive power; a second lens group having an overall negative refractive power, the second lens group including a liquid lens having a meniscus formed between non-miscible first and second liquids, the first liquid having conductivity and polarity, the meniscus having a curvature radius changing in response to a voltage applied to serve as a refractive surface, thereby autofocusing the optical system, a first cover lens for sealing the liquid lens at an object side and a second cover lens for sealing the liquid lens at an image side; a third lens group having an overall positive refractive power; and a fourth lens group having an overall negative refractive power.

Preferably, the first cover lens has a curvature radius at the object side and the liquid lens has a curvature radius at the meniscus, respectively, according to following relations 1 and 2:

$$R4 \times Rf6 < 0 \quad \text{relation 1, and}$$

$$R4 \times Rn6 > 0 \quad \text{relation 2,}$$

where R4 is a curvature radius of the first cover lens at the object side, Rf6 is a curvature radius of the meniscus at a long distance focus, and Rn6 is a curvature radius of the meniscus at a short distance focus.

Preferably, the second lens group has a refractive power according to following relation 3:

$$|F'2|/|F2| < 1.2 \quad \text{relation 3,}$$

where F'2 is a total focal length of the second lens group at a short distance focus, and F2 is a total focal length of the second lens group at a long distance focus.

Preferably, the first lens group has a refractive power according to following relation 4:

$$0.4 < F1/F < 0.7 \quad \text{relation 4,}$$

where F1 is a total focal length of the first lens group, and F is a focal length of an entire optical system at a long distance focus.

Preferably, the third and fourth lens groups have a refractive power according to following relation 5:

$$-1.2 < F3/F4 < -0.7 \quad \text{relation 5,}$$

where F3 is a total focal length of the third lens group and F4 is a total focal length of the fourth lens group.

Preferably, the second and third lens groups have a refractive power according to following relation 6:

$$-1.0 < F2/F3 < -0.8 \quad \text{relation 6,}$$

where F2 is a total focal length of the second lens group at a long distance focus, and F3 is a total focal length of the third lens group.

Preferably, the optical system includes an aperture stop disposed in front of the liquid lens to remove unnecessary light.

Preferably, at least one of refractive surfaces of the first and second cover lenses is spherical or aspherical.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 2:
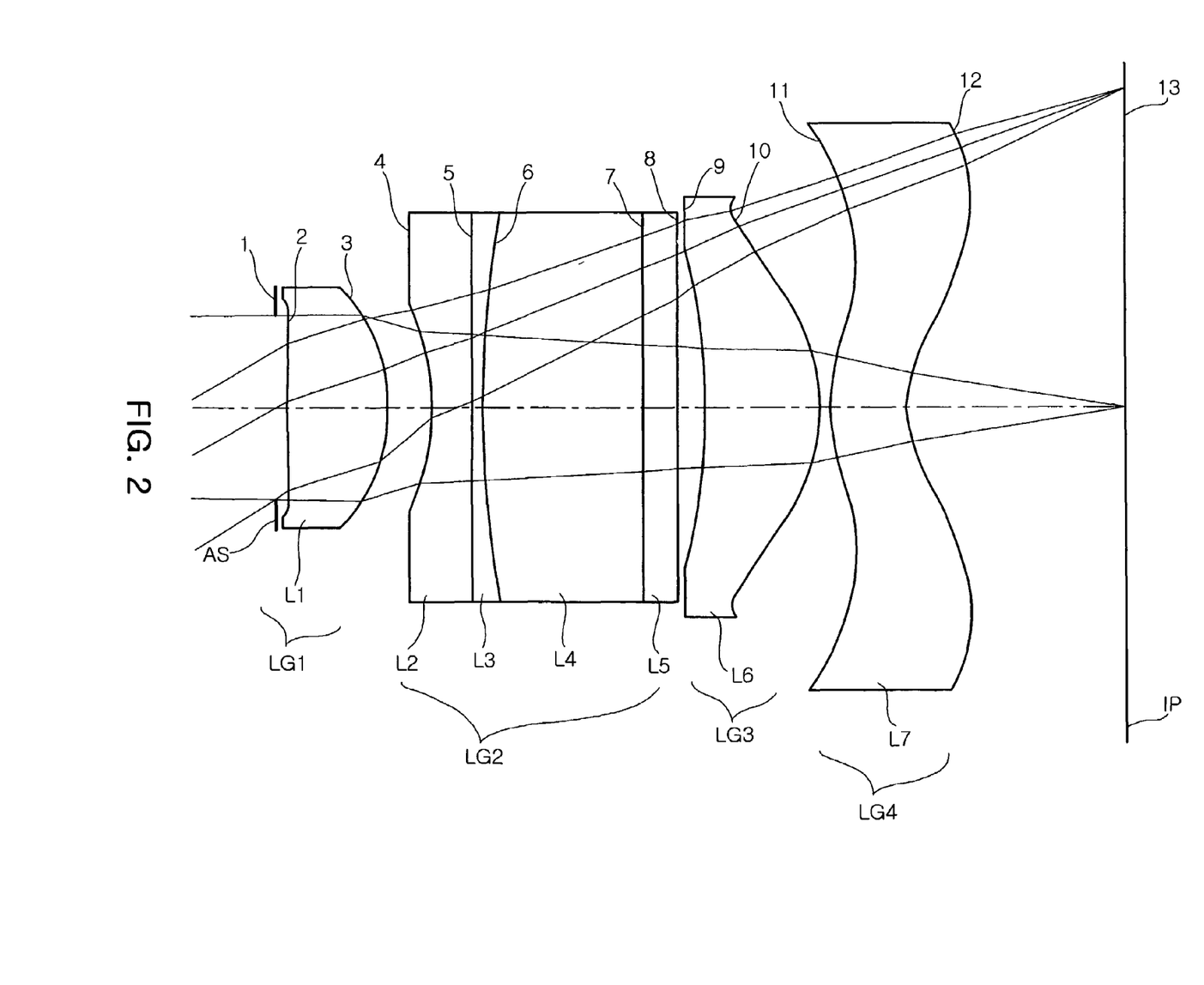
FIG. 2 is a diagram illustrating lens arrangement of an autofocusing optical system according to a first embodiment of the invention.

FIG. 2 is a diagram illustrating lens arrangement of an autofocusing optical system according to a first embodiment of the invention. In the following drawings, the thickness, size, shape of the lens are somewhat exaggerated for clarity, and particularly, the shape of a spherical or aspherical surface is illustrative but not limiting the invention.

As shown in FIG. 2, the autofocusing optical system of a camera module of the invention includes a first lens group LG1 with a positive refractive power, a second lens group LG2 with a negative refractive power, a third lens group LG3 with a positive refractive power and a fourth lens group LG4 with a negative refractive power sequentially positioned from an object side to an image side.

The first lens group LG1 includes a first lens L1 with a positive refractive power. The third lens LG3 includes a sixth lens L6 with a positive refractive power. The fourth lens LG4 includes a seventh lens L7 with a negative refractive power.

Also, the second lens group LG2 includes a third lens L3, a fourth lens L4, a second lens L2, and a fifth lens L5. The third lens L3 is made of a first liquid and the fourth lens L4 is made of a second liquid which is non-miscible with the first liquid. The second lens L2 seals the third lens L3 at the object side and the fifth lens L5 seals the fourth lens L4 at the image side. Here, one of the non-miscible first and second liquids has conductivity and polarity. A meniscus formed between the first and second liquids has a curvature radius changing in response to a voltage applied to serve as a refractive surface. That is, the third and fourth lenses L3

L4 make up a liquid lens. The second lens L2 serves as a first cover lens for sealing the liquid lens at the object side and the fifth lens L5 serves as a second cover lens for sealing the liquid lens at the image side.

Moreover, at least one of refractive surfaces of the second and fifth lenses L2 and L5 is spherical or aspherical, thus reducing the number of the lenses necessary for attaining certain optical properties.

According to the invention, the first lens group LG1 corrects spherical aberration and astigmatic aberration. In the second lens group LG2, the meniscus formed in the liquid lens L3 and L4 has a curvature radius changing in response to a voltage applied, thereby autofocusing the optical system.

The third lens group LG3 corrects astigmatic aberration and distortion and the fourth lens group LG4 corrects distortion.

As described above, the liquid lens L3 and L4 is arranged in the second lens group LG2, and thereby can more reliably withstand drop impact than in a case where the liquid lens L3 and L4 is positioned in the first lens group LG1. The second lens group LG2 with the liquid lens L3 and L4 therein can be optimally designed to suit functions of the other lens groups in case of short and long distance focusing.

Meanwhile, an aperture stop AS is disposed in front of the liquid lens to minimize its effects on the definition of a surrounding area. That is, the autofocusing optical system using the liquid lens advantageously does not require a mechanical transport device for focusing. However, this may result in field curvature aberration, thus degrading the definition of the surrounding area, due to change in the curvature radius of the meniscus. To minimize this problem, according to the invention, the aperture stop is located in front of the liquid lens L3 and L4, whose meniscus has a curvature radius changing, thereby minimizing effects on the definition of an entire field.

Meanwhile, a cover glass (not illustrated) can be disposed behind the fourth lens LG4 to serve as e.g., an optical low band filter, a color filter, and a face plate. Also, the image plane IP accommodates images formed by the lenses, and is an image plane of, e.g., a CCD sensor or a CMOS sensor.

The optical system with these characteristics as just described satisfies following relations according to an embodiment of the invention.

Relations 1 and 2 define focusing of a liquid lens, which performs autofocusing:

$$R4 \times Rf6 < 0 \qquad \text{relation 1, and}$$

$$R4 \times Rn6 > 0 \qquad \text{relation 2,}$$

where R4 is a curvature radius of the first cover lens at the object side, Rf6 is a curvature radius of the meniscus at a long distance focus, and Rn6 is a curvature radius of the meniscus at a short distance focus.

The relations 1 and 2, unless satisfied, cannot reduce spherical aberration which occurs when a meniscus of the liquid lens has a curvature radius changing in accordance with changes in the distance of the object.

That is, relations 1 and 2 prescribe a direction of the curvature radius which is changed during focusing. In case of short distance focusing, the curvature radius of the meniscus is so lowered that light cannot propagate therethrough. This leads to excessive occurrence of spherical aberration and vignetting phenomenon, subsequently failing to perform desired focusing.

The second lens group LG2 has a refractive power according to following relation 3:

$$|F'2|/|F2| < 1.2 \qquad \text{relation 3,}$$

where F'2 is a total focal length of the second lens group LG2 at a short distance focus, and F2 is a total focal length of the second lens group LG2 at a long distance focus.

Specifically, relation 3 prescribes a refractive power of the second lens group LG2 necessary for focusing from a long distance focus to a short distance focus (e.g., 5 cm).

Relation 3, if in excess of the upper limit, leads to decrease in a focal length range. That is, if relation 3 exceeds the upper limit, a focal length of the second lens group LG2 becomes greater than the total focal length. This prolongs a back focal length (BFL), thereby decreasing the focus adjustable range of a subject.

A refractive power of the first lens group L1 is defined by relation 4:

$$0.4 < F1/F < 0.7 \qquad \text{relation 4,}$$

where F1 is a total focal length of the first lens group LG1, and F is a focal length of the entire optical system at a long distance focus.

Relation 4, if in excess of the upper limit, results in degradation of the definition of a peripheral area of image plane. Meanwhile, if relation 4 falls below the lower limit, curvature of image field occurs.

A refractive power of the third and fourth lens groups LG3 and LG4 is defined by relation 5:

$$-1.2 < F3/F4 < -0.7 \qquad \text{relation 5,}$$

where F3 is a total focal length of the third lens group LG3 and F4 is a total focal length of the fourth lens group LG4.

If relation 5 deviates from the upper and lower limits, a vignetting phenomenon occurs excessively in a peripheral area of image plane, thereby increasing a peripheral light ratio and coma aberration.

A refractive power of the third lens group LG3 is governed by relation 6.

$$-1.0 < F2/F3 < -0.8 \qquad \text{relation 6}$$

where F2 is a total focal length of the second lens group LG2 at a long distance focus and F3 is a total focal length of the third lens group LG3.

If relation 6 deviates from the upper and lower limits, vignetting of light is caused to diminish a peripheral light ratio. Also, with a curvature radius of the meniscus changing, the image can be partially out of the image plane. That is, a portion of the image may not be formed on the image plane.

The invention will be explained hereunder through detailed examples.

Figure 5:
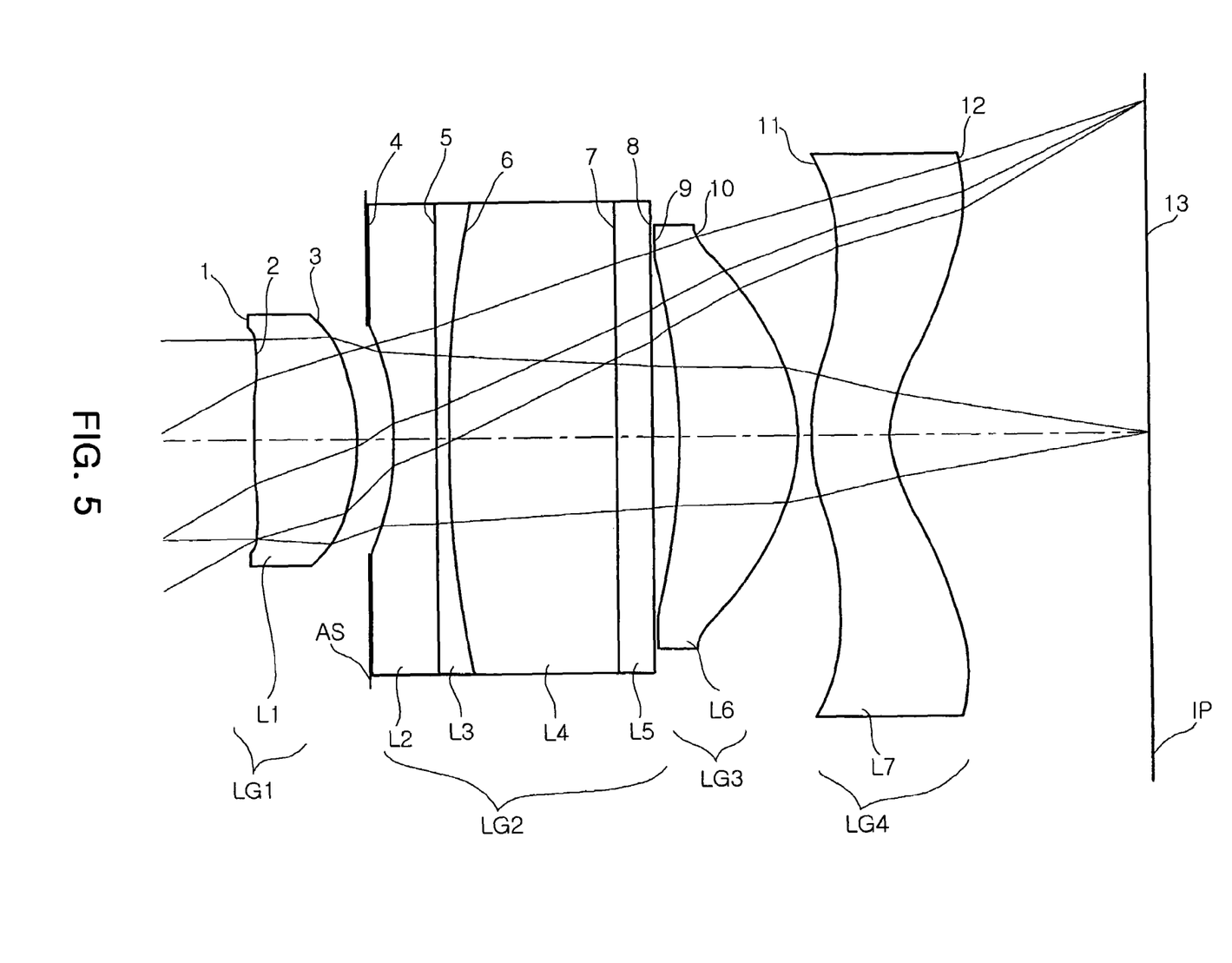
FIG. 5 is a diagram illustrating lens arrangement of an autofocusing optical system according to a second embodiment of the invention.
Figure 8:
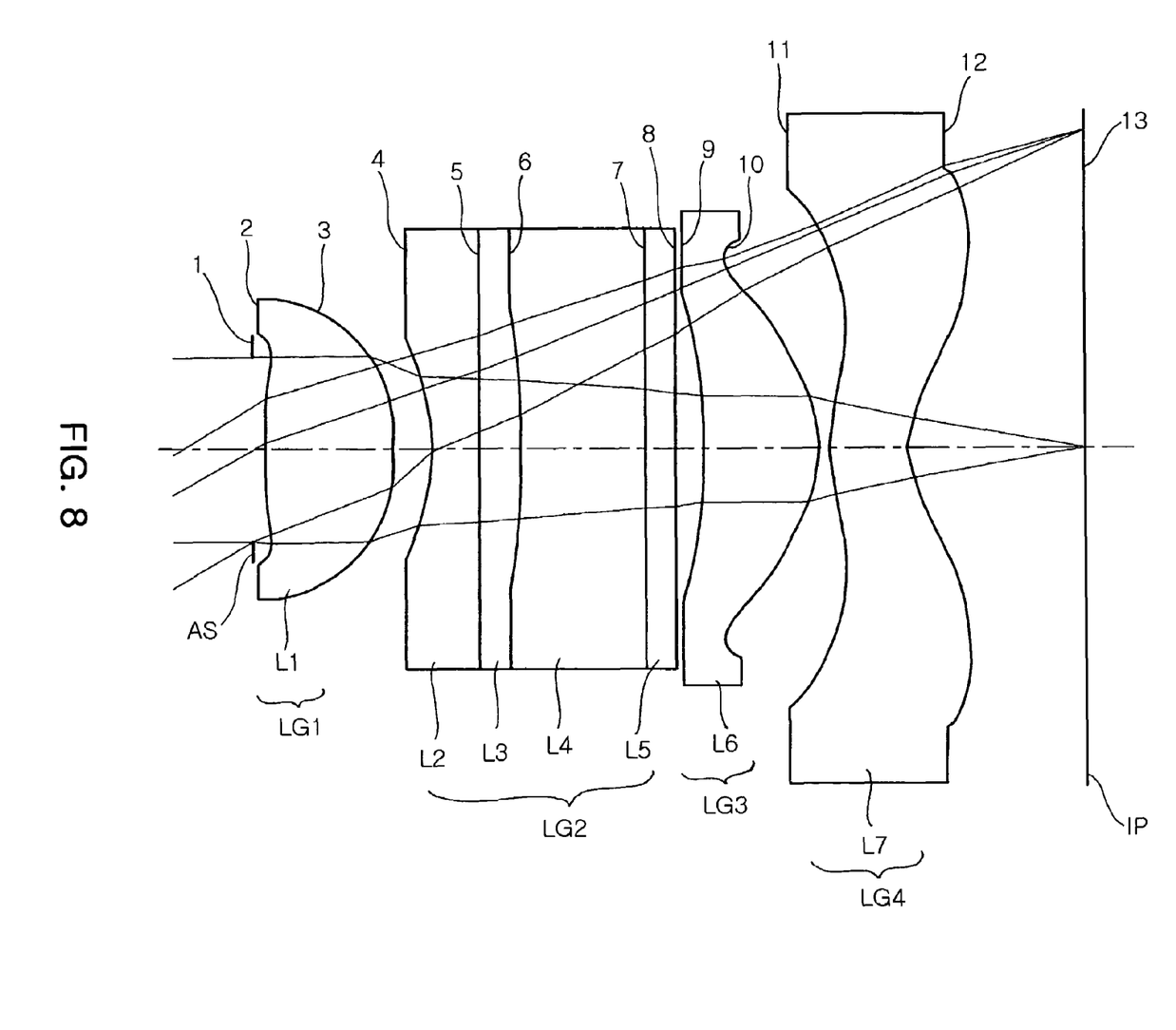
FIG. 8 is a diagram illustrating lens arrangement of an autofocusing optical system according to a third embodiment of the invention.

In each of examples 1 to 3, as described above, an optical system includes a first lens group LG1, a second lens group LG2, a third lens group LG3, and a fourth lens group sequentially positioned from an object side to an image side. The first lens group LG1 includes a first lens with a positive refractive power. The second lens group LG2 includes a liquid lens L3 and L4 with an overall negative refractive power. The third lens group LG3 includes a sixth lens L6 with a positive refractive power. The fourth lens group LG4 includes a seventh lens L7 with a negative refractive power.

Here, the second lens group LG2 includes a third lens L3, a fourth lens L4, a second lens L2, and a fifth lens L5. The third lens L3 is made of a first liquid. The fourth lens 14 is made of a second liquid, which is non-miscible with the first liquid. The second lens L2 seals the third lens L3 at the object side to serve as a first cover lens. The fifth lens L5 seals the fourth lens L4 at the image side to serve as the second cover lens.

Also, the image plane IP serves as an image sensor such as a CCD and CMOS. Examples 1, 3 and 2 differ only in location of an aperture stop. That is, the aperture stop is disposed in front of the first lens L1 in Examples 1 and 3 but in front of the second lens L2 in Example 2. However, the aperture stops AS of Examples 1 to 3 are located in front of the liquid lens L3 and L4.

The aspherical surfaces of the Examples are obtained from a known equation 1:

$$Z = \frac{cY^2}{1 + \sqrt{1 - (1+K)c^2Y^2}} + AY^4 + BY^6 + CY^8 + DY^{10} + EY^{12} + FY^{14} + \ldots$$

equation 1, where Z is a distance from a vertex of the lens toward an optical axis direction, Y is a distance toward a direction perpendicular to the optical axis, c is a reciprocal number of a curvature radius r at the vertex of the lens, K is a conic constant, and A, B, C, D, E and F are aspherical coefficients.

In Equation 1 above, 'E and a number following the E' used in a conic constant K and aspherical coefficients A to E represent 10' power. For example, E+01 represents $10^1$ and E-02 represents $10^{-2}$.

Example 1

Table 1 below shows exemplary aberrations of an optical system according to Example 1 of the invention.

Figure 3:
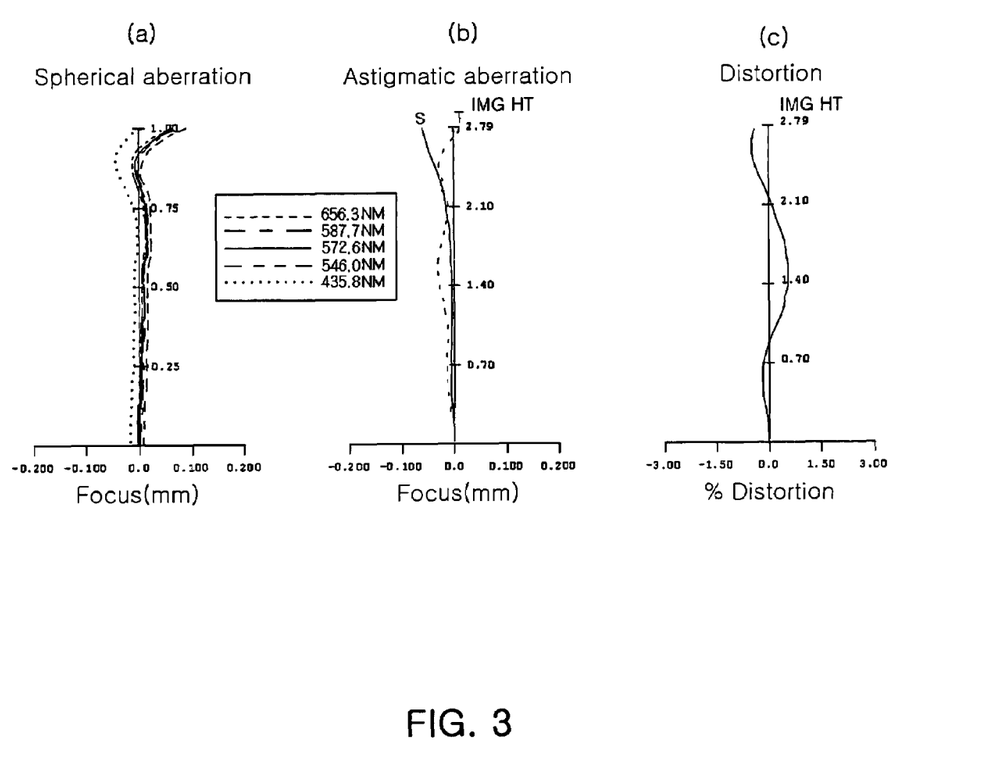
FIGS. 3(a) to 3(c) are graphs illustrating spherical aberration, astigmatic aberration and distortion characteristics of the autofocusing optical system as shown in FIG. 2.
Figure 4:
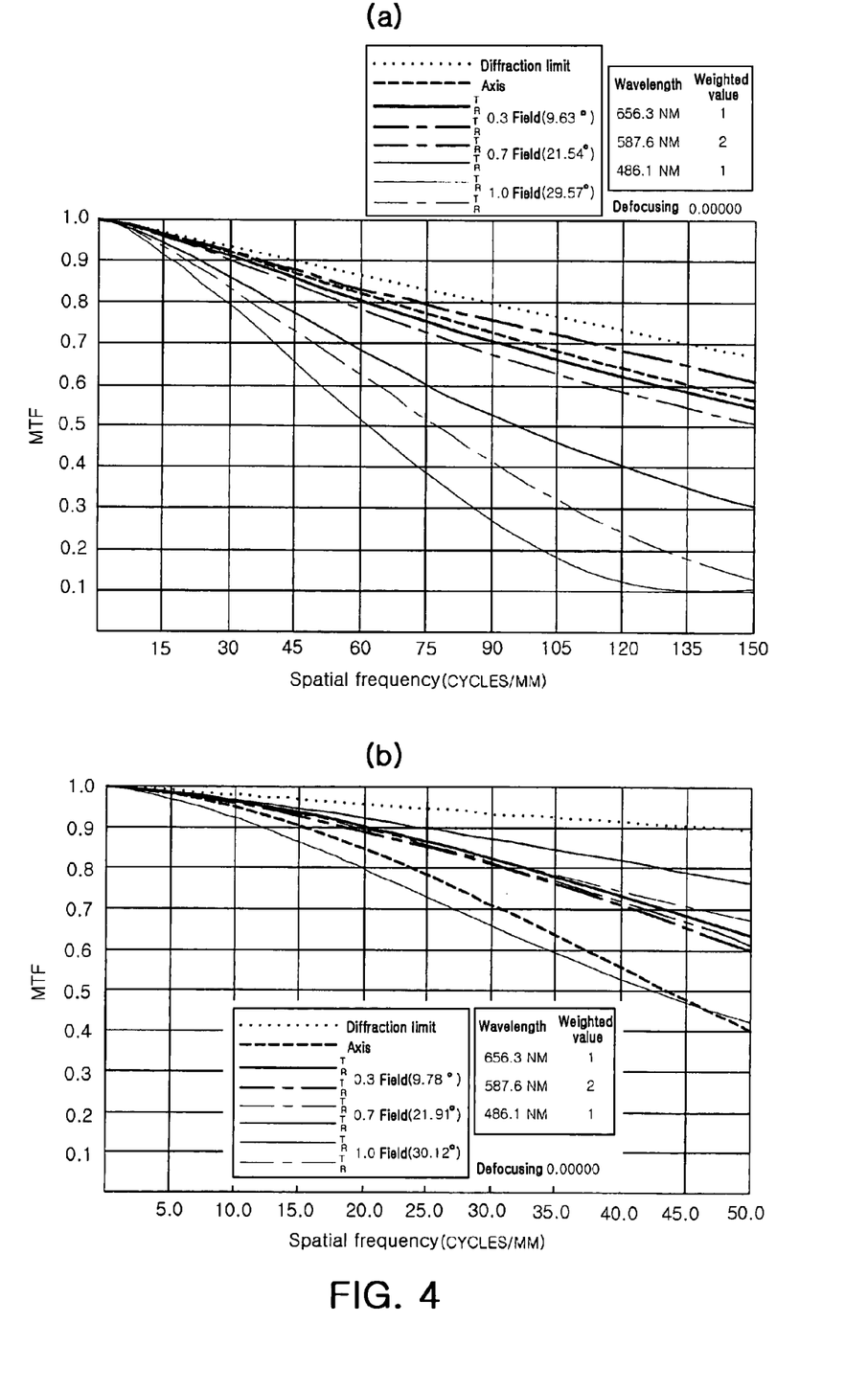
FIGS. 4(a) and 4(b) are graphs illustrating, MTF characteristics of the autofocusing optical system of FIG. 2 at long and short distance focuses, respectively.

FIG. 2 is a diagram illustrating lens arrangement of an autofocusing optical system according to Example 1. FIGS. 3(a) to 3(c) are graphs illustrating spherical aberration, astigmatic aberration and distortion of the autofocusing optical system shown in Tables 1 and 2. FIGS. 4(a) and 4(b) are graphs illustrating MFG characteristics of the autofocusing optical system shown in Tables 1 and 2 at long and short distance focuses.

In the following astigmatic aberrational diagram, "S" denotes sagittal and "T" denotes tangential.

Also, Modulation Transfer Function (MTF) is determined by a spacial frequency per millimeter cycle. MTF is defined by the maximum intensity and the minimum intensity of light according to following equation 2:

$$MTF = \frac{Max - Min}{Max + Min},\quad \text{equation 2}$$

where Max indicates the maximum intensity of light, and Min indicates the minimum intensity of light.

That is, MTF is most ideal when 1 and decrease in MTF also leads to decrease in definition.

In Example 1, an F number FNo is 3.0, an angle of view is 60 degree, a distance between the aperture stop and the image plane is 7.35 mm. The optical system has a total focal length F of 4.95 mm at a long distance focus, and a total focal length of 4.66 mm at a short distance focus. Also, the first lens LG1 has a focal length F1 of 2.9202 mm, the second lens group LG2 has a focal length F2 of −3.5758 mm at a long distance focus, the second lens group LG2 has a focal length F'2 of −3.7661 mm at a short distance focus, the third lens LG3 has a focal length of 3.8462 mm, and the fourth lens group LG4 has a focal length F4 of −4.6836 mm. Moreover, the third lens L3 and the fourth lens L4 make up a liquid lens. The third lens L3 is made of an insulating liquid and the fourth lens L4 is made of electrolyte.

TABLE 1

| Surface No. | Radius of Curvature R(mm) | Surface Interval t (mm) | Refractive Index $n_d$ | Abbe Number $v_d$ | Remarks |
|---|---|---|---|---|---|
| 1 | ∞ | 0.1000 | — | — | Aperture stop |
| *2 | 6.0944 | 0.8700 | 1.53 | 55.87 | First lens |
| *3 | −1.9755 | 0.3771 | — | — | |
| 4 | −2.5000 | 0.3500 | 1.67 | 32.17 | Second lens |
| 5 | ∞ | X-Variable 2 | 1.49 | 33.17 | Third lens |
| 6 | X-Variable 1 | X-Variable 3 | 1.40 | 50.57 | Fourth lens |
| 7 | ∞ | 0.3000 | 1.5230 | 55.00 | Fifth lens |
| 8 | ∞ | 0.2276 | — | — | |
| *9 | −5.1834 | 1.0000 | 1.53 | 55.87 | Sixth lens |
| *10 | −1.5625 | 0.1000 | — | — | |
| *11 | 1.5750 | 0.6500 | 1.63 | 27.43 | Seventh lens |
| *12 | 0.8562 | 1.8752 | — | — | |
| 13 | ∞ | — | — | — | Image plane |

In Table 1, X denotes a variable curvature radius of a refractive surface in case of zooming, and a variable interval between the refractive surfaces. Table 2 shows values varied in accordance with distance of the object (focal length).

TABLE 2

| | Distance of object | | |
|---|---|---|---|
| | Infinite (∞) | 40 cm | 10 cm |
| X-Variable 1 | 10.0000 | 14.7800 | −24.5600 |
| X-Variable 2 | 0.22 | 0.24 | 0.36 |
| X-Variable 3 | 1.27 | 1.25 | 1.14 |

Further, in Table 1, * denotes an aspherical surface, and Table 3 indicates a conic coefficient K and aspherical coefficients A, B, C, D and E according to equation 1.

TABLE 3

| Surface No. | K | A | B | C | D | E |
|---|---|---|---|---|---|---|
| *2 | −7.3915E+01 | −1.7622E−02 | −9.6796E−03 | −1.8381E−01 | 2.9723E−01 | −2.0888E−01 |
| *3 | 1.6876E+00 | −1.0929E−02 | 2.1583E−02 | −6.2200E−02 | 6.4181E−02 | −2.6458E−02 |
| *9 | 4.2363E+00 | 4.6474E−02 | −3.2296E−02 | 5.3430E−03 | 2.4433E−03 | −4.8651E−04 |
| *10 | −7.3530E−01 | 4.8133E−02 | −1.5352E−02 | −1.6332E−04 | 9.3127E−04 | 8.7996E−05 |
| *11 | −1.3552E+00 | −1.4315E−01 | 2.8044E−02 | −2.1056E−03 | −6.7479E−05 | 1.2056E−05 |
| *12 | −2.5941E+00 | −8.5255E−02 | 2.4201E−02 | −4.6813E−03 | 5.0424E−04 | −2.3216E−05 |

Example 2

Table 4 below shows exemplary aberrations of an optical system according to Example 2 of the invention.

Figure 6:
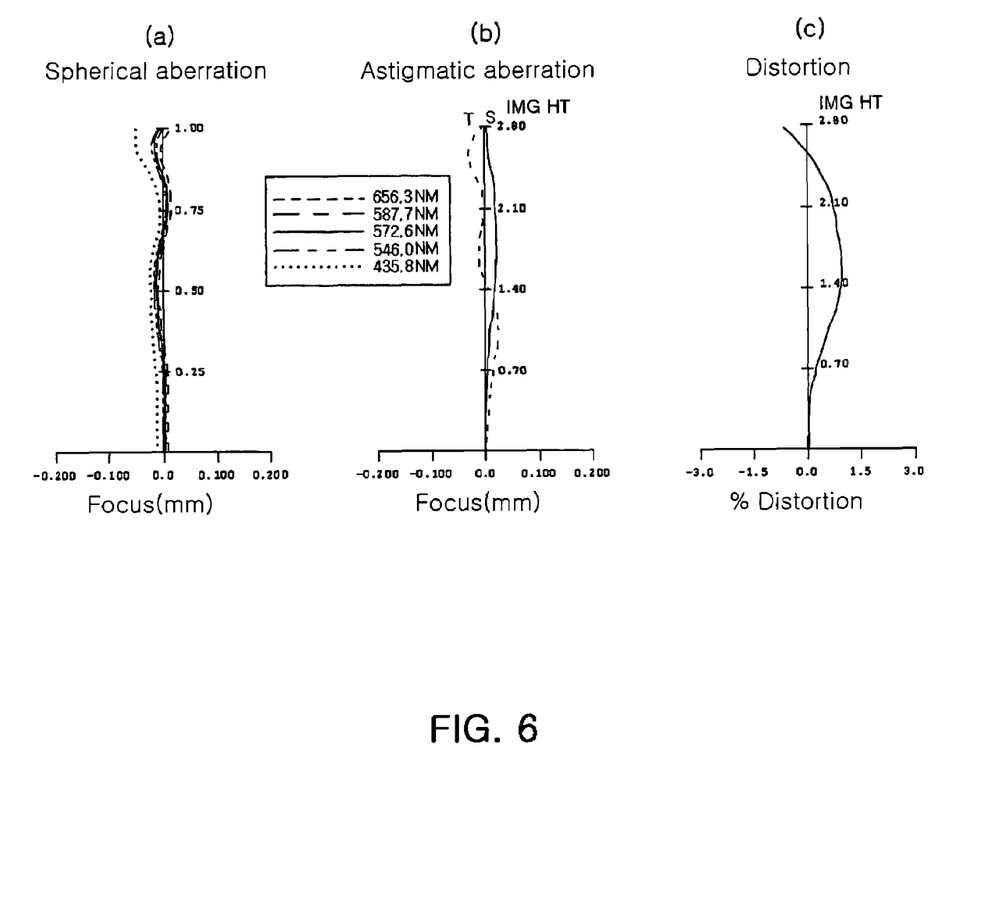
FIGS. 6(a) to 6(c) are graphs illustrating spherical aberration, astigmatic aberration and distortion characteristics of an autofocusing optical system shown in FIG. 5.
Figure 7:
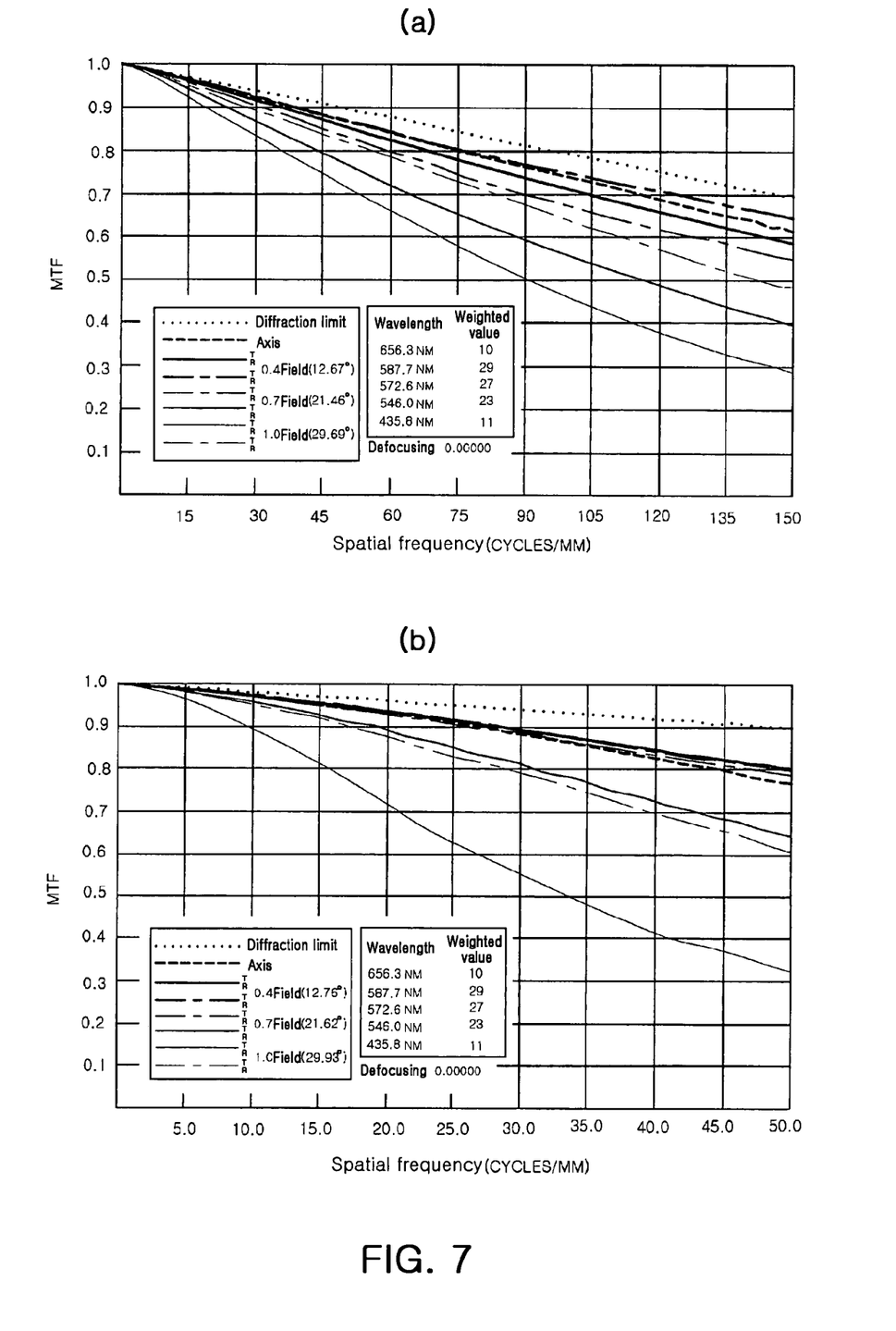
FIGS. 7(a) and 7(b) are graphs illustrating MTF characteristics of an autofocusing optical system shown in FIG. 5 at long and short distance focuses, respectively.

FIG. 5 is a diagram illustrating lens arrangement of the autofocusing optical system according to Example 2 of the invention. FIGS. 6(a) to 6(c) are graphs illustrating spherical aberration, astigmatic aberration and distortion of the autofocusing optical system shown in Tables 4 and 5. FIGS. 7(a) and 7(b) are graphs illustrating MTF characteristics of the autofocusing optical system shown in Tables 4 and 5 at long and short distance focuses.

In Example 2, an F number FNo is 2.92, an angle of view is 60 degree, a distance of the first lens from the object side 1 to the image plane is 7.44 mm. The optical system has a total focal length F of 4.95 mm at a long distance focus, and a total focal length of 4.66 mm at a short distance focus. Also, the first lens group LG1 has a focal length F1 of 2.9654 mm, the second lens group LG2 has a focal length F2 of −3.5758 mm at a long distance focus, the second lens group LG2 has a focal length F'2 of −3.7627 mm at a short distance focus, the third lens group LG3 has a focal length F3 of 3.6493 mm, the fourth lens group LG4 has a focal length of −4.7488 mm. The third and fourth lenses L3 and L4 serve as a liquid lens. The third lens L3 is made of an insulating liquid and the fourth lens L4 is made of electrolyte.

TABLE 4

| Surface No. | Radius of Curvature R(mm) | Surface Interval t (mm) | Refractive Index $n_d$ | Abbe Number $v_d$ | Remarks |
|---|---|---|---|---|---|
| *1 | 6.5654 | 0.8700 | 1.53 | 55.87 | First lens |
| *2 | −1.9749 | 0.1000 | — | — | |
| 3 | ∞ | 0.2085 | — | — | Aperture stop |
| 4 | −2.5000 | 0.3500 | 1.67 | 32.17 | Second lens |
| 5 | ∞ | ✕Variable 2 | 1.49 | 33.17 | Third lens |
| 6 | ✕Variable 1 | ✕Variable 3 | 1.40 | 50.57 | Fourth lens |
| 7 | ∞ | 0.3000 | 1.5230 | 55.00 | Fifth lens |
| 8 | ∞ | 0.2292 | — | — | |
| *9 | −4.9573 | 1.0000 | 1.53 | 55.87 | Sixth lens |
| *10 | −1.4901 | 0.1000 | — | — | |
| *11 | 1.6402 | 0.6500 | 1.63 | 27.43 | Seventh lens |
| *12 | 0.8896 | 2.1385 | — | — | |
| 13 | ∞ | — | — | — | Image plane |

In Table 4, ✕ denotes a variable curvature radius of a refractive surface in case of zooming, and a variable interval between refractive surfaces. Table 5 shows values varied in accordance with distance of the object (focal length).

TABLE 5

| | Distance of object | | |
|---|---|---|---|
| | Infinite (∞) | 40 cm | 10 cm |
| ✕Variable 1 | 10.0000 | 15.3400 | −24.9800 |
| ✕Variable 2 | 0.22 | 0.26 | 0.37 |
| ✕Variable 3 | 1.27 | 1.24 | 1.13 |

Also, in Table 4, * denotes an aspherical surface and Table 3 indicates a conic coefficient K and aspherical coefficients A, B, C, D and E according to equation 1.

TABLE 6

| Surface No. | K | A | B | C | D | E |
|---|---|---|---|---|---|---|
| *1 | −9.8821E+01 | −8.7004E−03 | −1.0192E−02 | −1.9121E−01 | 2.9099E−01 | −1.7860E−01 |
| *2 | 1.2659E+00 | −1.4037E−02 | 1.8648E−02 | −5.9614E−02 | 5.6671E−02 | −2.4168E−02 |
| *9 | 3.9101E+00 | 3.9737E−02 | −3.1942E−02 | 5.5182E−03 | 2.4237E−03 | −4.8265E−04 |
| *10 | −7.2897E−01 | 4.6729E−02 | −1.4621E−02 | −5.7910E−04 | 8.3941E−04 | 1.1680E−04 |
| *11 | −9.6668E−01 | −1.3866E−01 | 2.6803E−02 | −2.1271E−03 | −7.1590E−05 | 1.3186E−05 |
| *12 | −2.5012E+00 | −8.0775E−02 | 2.4497E−02 | −4.7316E−03 | 4.9908E−04 | −2.2542E−05 |

Example 3

Table 7 below shows exemplary aberrations of an optical system according to Example 3 of the invention.

Figure 9:
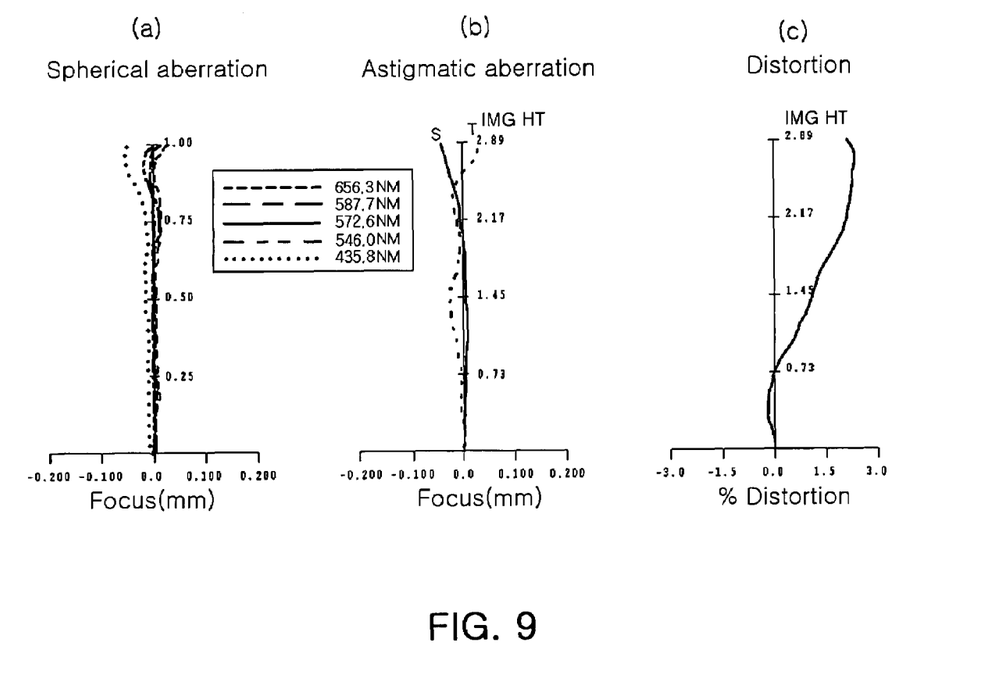
FIGS. 9(a) to 9(c) are graphs illustrating spherical aberration, astigmatic aberration and distortion characteristics of the autofocusing optical system shown in FIG. 8.
Figure 10:
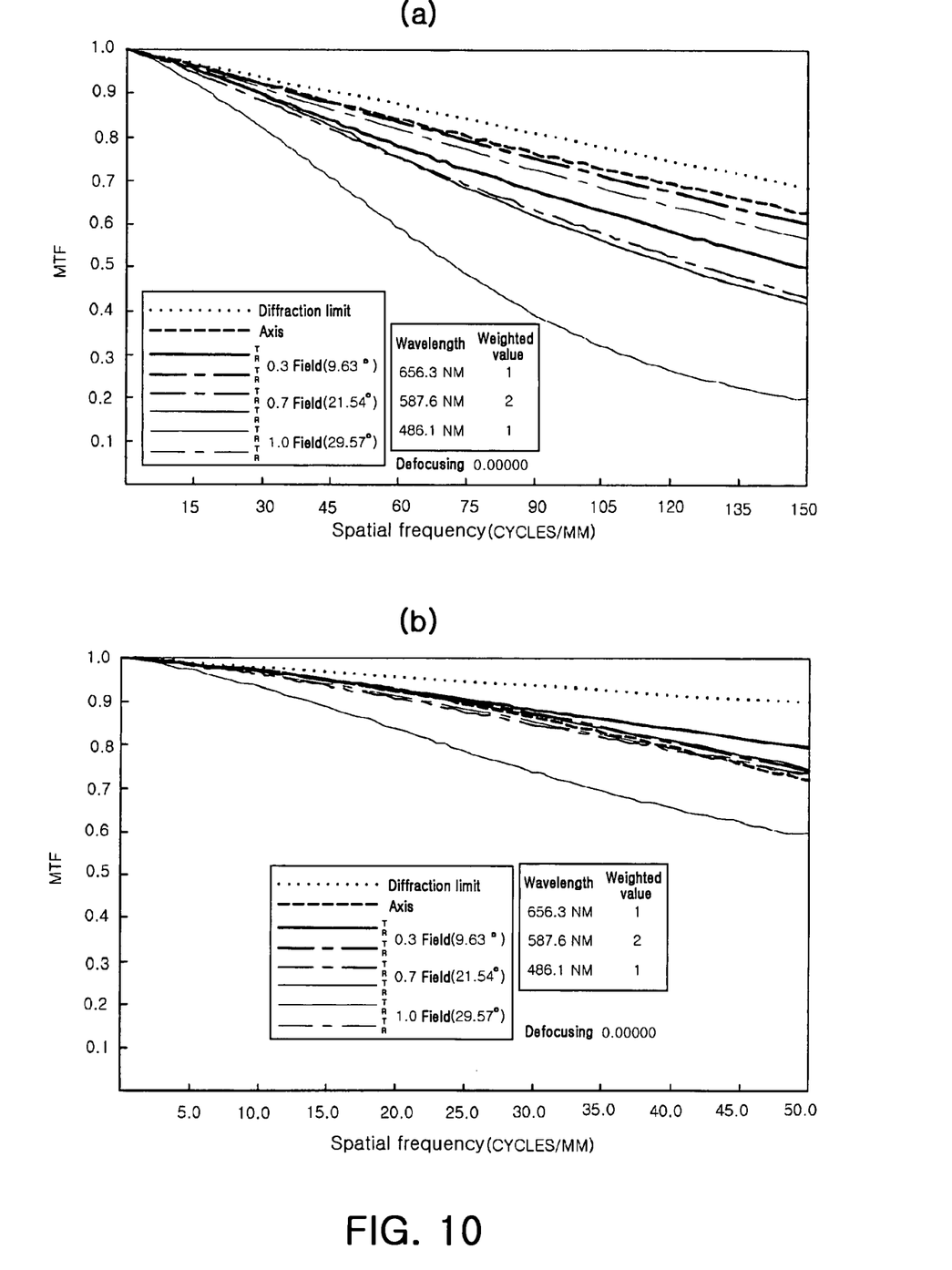
FIGS. 10(a) and 10(b) are graphs illustrating MTF characteristics of an autofocusing optical system shown in FIG. 8 at long and short distance focuses, respectively.

FIG. 8 is a diagram illustrating lens arrangement of the autofocusing optical system according to Example 3 of the invention. FIGS. 9(a) to 9(c) are graphs illustrating spherical aberration, astigmatic aberration and distortion of the autofocusing optical system shown in Tables 7 and 8'. FIGS. 10(a) and 10(b) are graphs illustrating MTF characteristics of the autofocusing optical system shown in Tables 7 and 8 at long and short distance focuses.

In Example 3, an F number FNo is 2.92, an angle of view is 60 degree, a distance of the first lens L1 from the object side 1 to the image plane is 7.389 mm. The optical system has a total focal length F of 4.95 mm at a long distance focus and a total focal length of 4.66 mm at a short distance focus. The first lens group LG1 has a focal length F1 of 2.6652 mm, the second lens group LG2 has a focal length F2 of −3.2059 mm at a long distance focus, and a focal length F'2 of −3.4084 mm at a short distance focus, the third lens group LG3 has a focal length F3 of 3.2155 mm, and the fourth lens group LG4 has a focal length F4 of −3.2197 mm. The third lens L3 and the fourth lens L4 serve as a liquid lens. The third lens L3 is made of an insulating liquid and the fourth lens L4 is made of electrolyte.

TABLE 7

| Surface No. | Radius of Curvature R(mm) | Surface Interval t (mm) | Refractive Index $n_d$ | Abbe Number $v_d$ | Remarks |
|---|---|---|---|---|---|
| 1 | ∞ | 0.1000 | | | Aperture stop |
| *2 | 5.0545 | 1.1389 | 1.53 | 55.87 | First lens |
| 3 | −1.8107 | 0.3458 | | | |
| 4 | −2.2122 | 0.4000 | 1.67 | 32.17 | Second lens |
| 5 | ∞ | ✕Variable 2 | 1.49 | 33.17 | Third lens |

TABLE 7-continued

| Surface No. | Radius of Curvature R(mm) | Surface Interval t (mm) | Refractive Index $n_d$ | Abbe Number $v_d$ | Remarks |
|---|---|---|---|---|---|
| 6 | ✕Variable 1 | ✕Variable 3 | 1.40 | 50.57 | Fourth lens |
| 7 | ∞ | 0.3000 | 1.5230 | 55.00 | Fifth lens |
| 8 | ∞ | 0.2290 | | | |
| *9 | −4.5180 | 1.0270 | 1.53 | 55.87 | Sixth lens |
| *10 | −1.3363 | 0.1000 | | | |
| *11 | 1.9381 | 0.7000 | 1.63 | 27.43 | Seventh lens |
| *12 | 0.8414 | 1.5487 | | | |
| 13 | ∞ | | | | Image plane |

In Table 7, ✕ denotes a variable curvature radius of a refractive surface in case of zooming, and a variable interval between the refractive surfaces. Table 8 shows values varied in accordance with distance of the object (focal length).

TABLE 8

| | Distance of object | | |
|---|---|---|---|
| | Infinite (∞) | 40 cm | 10 cm |
| ✕Variable 1 | 15.0000 | 43.4766 | −9.2938 |
| ✕Variable 2 | 0.25 | 0.30 | 0.39 |
| ✕Variable 3 | 1.25 | 1.20 | 1.11 |

Also, in Table 7, * denotes an aspherical surface and Table 7 indicates a conic coefficient K and aspherical coefficients A, B, C, D and E according to equation 1.

TABLE 9

| Surface No. | K | A | B | C | D | E |
|---|---|---|---|---|---|---|
| *2 | −2.2633E+01 | −2.2477E−02 | 1.8404E−01 | −1.6006E−01 | 2.1203E−01 | −1.2688E−01 |
| *3 | 7.2147E−01 | −5.9330E−03 | 1.9293E−02 | −5.9614E−02 | 3.7504E−02 | −1.3465E−02 |
| *9 | 3.3824E+00 | 3.9285E−02 | −2.7994E−02 | 5.2202E−03 | 2.2882E−03 | −4.6486E−04 |
| *10 | −8.2830E−01 | 6.2478E−02 | −1.7924E−02 | −5.7324E−05 | 1.1054E−03 | 5.6557E−05 |
| *11 | −6.8416E+00 | −9.5591E−02 | 2.3315E−02 | −2.8352E−03 | 1.1176E−04 | −7.6179E−08 |
| *12 | −3.2603E+00 | −7.3589E−02 | 2.2500E−02 | −4.3987E−03 | 4.5293E−04 | −1.9805E−05 |

Meanwhile, Table 10 notes values of the equations 1 to 6 with respect to Examples 1 to 3.

TABLE 10

| | Example 1 | Example 2 | Example 3 |
|---|---|---|---|
| Relation 1 | −25 | −25 | −33.182 |
| Relation 2 | 61.4 | 62.45 | 20.559 |
| Relation 3 | 1.05 | 1.03 | 1.015 |
| Relation 4 | 0.589 | 0.599 | 0.538 |
| Relation 5 | −0.821 | −0.768 | −0.999 |
| Relation 6 | −0.929 | −0.979 | −0.997 |

As shown in Table 10, Examples 1 to 3 of the invention are found to fulfill the relations 1 to 6.

These Examples produce an autofocusing optical system superior in various aberrational characteristics as shown in FIGS. 3(a) to 3(c), FIGS. 6(a) to 6(c) and FIGS. 9(a) to 9(c), in MTF characteristics at a long distance focus as shown in FIGS. 4(a), 7(a), and 10(a), and in MTF characteristics at a short distance focus as shown in FIGS. 4(b), 7(b), and 10(b).

As set forth above, according to exemplary embodiments of the invention, an autofocusing optical system adopting a liquid lens can be manufactured in small size and with high definition, exhibiting various aberrational characteristics.

Also, the optical system includes the liquid lens in the second lens group to reliably absorb drop impact. This optical system can be stably employed in a mobile telecommunication terminal.

Moreover, the optical system adopting the liquid lens is applicable to a subminiature camera module.

According to the invention, an aperture stop is disposed in front of the liquid lens to minimize its effects on the definition of a surround area.

Furthermore, at least one of refractive surfaces of a second lens (a first cover lens) and a fifth lens (a second cover lens) which serve as a cover of the liquid lens is spherical or aspherical. This diminishes the number of the lenses necessary for achieving certain optical properties, thereby leading to a more compact optical system.

In addition, the liquid lens is disposed in the second lens group to effectively distribute a refractive power so that the compact optical system can have a relatively large tolerance.

The optical system of the invention using the liquid lens consumes less power than the conventional one operating mechanically. Also, the optical system of the invention is free from an inclination problem that may be experienced in the conventional lens system during assembling and operation.

Notably, in this specification, first, third and fourth lens groups LG1, LG3, and LG4 are constructed of a single lens and a second les group LG 2 is constructed of four lenses or lens elements L2, L3, L4 and L5. However, the invention is not limited thereto if the optical system attains optical properties according to refractive power arrangement and relations of the invention.

While the present invention has been shown and described in connection with the preferred embodiments, it will be apparent to those skilled in the art that modifications and variations can be made without departing from the spirit and scope of the invention as defined by the appended claims.

What is claimed is:

1. An autofocusing optical system of a camera module comprising:
   a first lens group having an overall positive refractive power;
   a second lens group having an overall negative refractive power, the second lens group including a liquid lens having a meniscus formed between non-miscible first and second liquids, the first liquid having conductivity and polarity, the meniscus having a curvature radius changing in response to a voltage applied to serve as a refractive surface, thereby autofocusing the optical system, a first cover lens for sealing the liquid lens at an object side and a second cover lens for sealing the liquid lens at an image side;

a third lens group having an overall positive refractive power; and a fourth lens group having an overall negative refractive power.

2. The optical system according to claim 1, wherein the first cover lens has a curvature radius at the object side and the liquid lens has a curvature radius at the meniscus, respectively, according to following relations 1 and 2:

$$R4 \times Rf6 < 0 \qquad \text{relation 1, and}$$

$$R4 \times Rn6 > 0 \qquad \text{relation 2,}$$

where R4 is a curvature radius of the first cover lens at the object side, Rf6 is a curvature radius of the meniscus at a long distance focus, and Rn6 is a curvature radius of the meniscus at a short distance focus.

3. The optical system according to claim 2, wherein the second lens group has a refractive power according to following relation 3:

$$|F'2|/F2| < 1.2 \qquad \text{relation 3,}$$

where F'2 is a total focal length of the second lens group at a short distance focus, and F2 is a total focal length of the second lens group at a long distance focus.

4. The optical system according to claim 1, wherein the first lens group has a refractive power according to following relation 4:

$$0.4 < F1/F < 0.7 \qquad \text{relation 4,}$$

where F1 is a total focal length of the first lens group, and F is a focal length of an entire optical system at a long distance focus.

5. The optical system according to claim 1, wherein the third and fourth lens groups have a refractive power according to following relation 5:

$$-1.2 < F3/F4 < -0.7 \qquad \text{relation 5,}$$

where F3 is a total focal length of the third lens group and F4 is a total focal length of the fourth lens group.

6. The optical system according to claim 1, wherein the second and third lens groups have a refractive power according to following relation 6:

$$-1.0 < F2/F3 < -0.8 \qquad \text{relation 6,}$$

where F2 is a total focal length of the second lens group at a long distance focus, and F3 is a total focal length of the third lens group.

7. The optical system according to claim 1, comprising an aperture stop disposed in front of the liquid lens to remove unnecessary light.

8. The optical system according to claim 1, wherein at least one of refractive surfaces of the first and second cover lenses is spherical or aspherical.

9. The optical system according to claim 2, wherein the first lens group has a refractive power according to following relation 4:

$$0.4 < F1/F < 0.7 \qquad \text{relation 4,}$$

where F1 is a total focal length of the first lens group, and F is a focal length of an entire optical system at a long distance focus.

10. The optical system according to claim 2, wherein the third and fourth lens groups have a refractive power according to following relation 5:

$$-1.2 < F3/F4 < -0.7 \qquad \text{relation 5,}$$

where F3 is a total focal length of the third lens group and F4 is a total focal length of the fourth lens group.

11. The optical system according to claim 2, wherein the second and third lens groups have a refractive power according to following relation 6:

$$-1.0 < F2/F3 < -0.8 \qquad \text{relation 6,}$$

where F2 is a total focal length of the second lens group at a long distance focus, and F3 is a total focal length of the third lens group.

12. The optical system according to claim 3, wherein the first lens group has a refractive power according to following relation 4:

$$0.4 < F1/F < 0.7 \qquad \text{relation 4,}$$

where F1 is a total focal length of the first lens group, and F is a focal length of an entire optical system at a long distance focus.

13. The optical system according to claim 3, wherein the third and fourth lens groups have a refractive power according to following relation 5:

$$-1.2 < F3/F4 < -0.7 \qquad \text{relation 5,}$$

where F3 is a total focal length of the third lens group and F4 is a total focal length of the fourth lens group.

14. The optical system according to claim 3, wherein the second and third lens groups have a refractive power according to following relation 6:

$$-1.0 < F2/F3 < -0.8 \qquad \text{relation 6,}$$

where F2 is a total focal length of the second lens group at a long distance focus, and F3 is a total focal length of the third lens group.

* * * * *

UNITED STATES PATENT AND TRADEMARK OFFICE
CERTIFICATE OF CORRECTION

PATENT NO. : 7,342,726 B2 Page 1 of 1
APPLICATION NO. : 11/730333
DATED : March 11, 2008
INVENTOR(S) : Tae Young Kim It is certified that error appears in the above-identified patent and that said Letters Patent is hereby corrected as shown below:

Column 13, Line 22, change "$|F'2|/F21<1.2$" to --$|F'2| / |F2| < 1.2$--.

Signed and Sealed this

Twenty-sixth Day of August, 2008

JON W. DUDAS
*Director of the United States Patent and Trademark Office*